(12) United States Patent
Hwang

(10) Patent No.: US 8,584,787 B2
(45) Date of Patent: Nov. 19, 2013

(54) ACTIVE HOOD APPARATUS FOR VEHICLE

(75) Inventor: In Hwang, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/490,756

(22) Filed: Jun. 7, 2012

(65) Prior Publication Data

US 2013/0033069 A1 Feb. 7, 2013

(30) Foreign Application Priority Data

Aug. 1, 2011 (KR) .......................... 10-2011-0076352

(51) Int. Cl.
*B60R 21/38* (2011.01)

(52) U.S. Cl.
USPC ...................................... 180/274; 296/187.04

(58) Field of Classification Search
USPC ................. 180/274, 69.21, 69.2; 296/187.04; 292/DIG. 14, 337, 340
IPC ............................................ B60R 21/34,21/38
See application file for complete search history.

(56) References Cited

U.S. PATENT DOCUMENTS

| | | | |
|---|---|---|---|
| 2006/0006660 A1* | 1/2006 | Seo .................................. | 292/24 |
| 2012/0074715 A1* | 3/2012 | Kim ............................... | 292/201 |
| 2013/0087401 A1* | 4/2013 | Masih et al. ................... | 180/274 |

FOREIGN PATENT DOCUMENTS

| | | | |
|---|---|---|---|
| DE | 19957868 A1 * | 6/2001 | |
| EP | 1 541 432 A1 | 6/2005 | |
| JP | 2002-79906 A | 3/2002 | |
| JP | 2005-289367 A | 10/2005 | |
| JP | 2006-199179 A * | 8/2006 | |
| KR | 10-2006-0002175 A | 1/2006 | |
| KR | 10-2008-0017726 A | 2/2008 | |
| WO | WO 2005/037614 A1 * | 4/2005 | |

* cited by examiner

*Primary Examiner* — Ruth Ilan

(74) *Attorney, Agent, or Firm* — Morgan, Lewis & Bockius LLP

(57) ABSTRACT

Provided is an active hood apparatus for a vehicle including a main frame, a hood latch assembly, and a hood rise and fall device. The main frame is fixed to a vehicle body. The hood latch assembly is disposed at a back side of the main frame to lock and release a hood. The hood rise and fall device is disposed between the back side of the main frame and the hood latch assembly to move the hood latch assembly substantially vertically by a control signal of a controller that receives a sensing signal from a pedestrian collision sensor.

5 Claims, 5 Drawing Sheets

ACTIVE HOOD APPARATUS FOR VEHICLE

CROSS-REFERENCE TO RELATED APPLICATION

The present application claims priority of Korean Patent Application Number 10-2011-0076352 filed Aug. 1, 2011, the entire contents of which application is incorporated herein for all purposes by this reference.

BACKGROUND OF INVENTION

1. Field of Invention

The present invention relates to an active hood apparatus for a vehicle. More particularly, it relates to an active hood apparatus for a vehicle, which can absorb impact with a pedestrian and significantly reduce damage of the pedestrian, by lifting both front and rear ends of a hood upon collision with the pedestrian.

2. Description of Related Art

The hood of a vehicle is a part that covers the engine room of the vehicle and reduces the engine noise. Recently, active hood systems are being widely used.

The active hood systems lift hoods to protect a pedestrian upon collision with a vehicle. The active hood system is a sort of pedestrian protection safety apparatus that can absorb impact and reduce damage upon collision between a vehicle and a pedestrian.

As shown in FIG. 8, a typical active hood system includes a hinge assembly disposed at both rear ends of a hood 10 to serve as an opening/closing point, a hinge actuator 50 disposed near the hinge assembly to lift the hinge assembly, a pedestrian collision sensor 40 disposed at a bumper of a vehicle, and a controller 42 for receiving a signal from the pedestrian collision sensor 40 and driving the hinge actuator 50.

Accordingly, upon collision between a vehicle and a pedestrian, the pedestrian collision sensor 40 senses the collision, and the controller 42 receives a collision sensing signal and drives the hinge actuator 50. In this case, the hinge assembly is lifted by the driving of the hinge actuator 50, and simultaneously the rear end of the hood 44 equipped with the hinge assembly is lifted and pushes up a pedestrian to absorb impact.

However, in a typical active hood system, since only a part of pedestrian body is pushed up only by the lifting of the rear end of the hood, the impact-absorbing and damage-reducing functions are ineffective.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present disclosure provides an active hood apparatus for a vehicle, which can significantly increase the pedestrian protection performance by lifting the front end of a hood as well as the rear end thereof and pushing up a pedestrian to avoid or reduce collision impact.

In various aspects, the present disclosure provides an active hood apparatus for a vehicle, including: a main frame fixed to a vehicle body; a hood latch assembly disposed at a back side of the main frame to lock and release a hood; and a hood rise and fall device disposed between the back side of the main frame and the hood latch assembly, the hood rise and fall device moving the hood latch assembly substantially vertically by a control signal of a controller that receives a sensing signal from a pedestrian collision sensor.

Various aspects of the present invention provide for a hood latch assembly including a body plate having a first insert aperture into which a striker integrated with the hood is detachably inserted; an auxiliary plate having a second insert aperture that matches the first insert aperture, the auxiliary plate disposed to be spaced from a rear surface of the body plate; a hood release cable disposed at one side of an upper end of the body plate; a locking lever connected to the hood release cable at an upper end thereof and hinge-connected to one side of the auxiliary plate at a lower end thereof; a first spring fixed to one end of the body plate at one end thereof and fixed to the upper end of the locking lever at the other end thereof, wherein the first spring is elastically compressed when the locking lever is pulled; a latch plate having a third insert aperture at one end thereof, into which the striker inserted through the first insert aperture and the second insert aperture is lockably inserted, and the latch plate hinge-coupled to the other end of the auxiliary plate at the other end thereof; and a second spring fixed to one end of the body plate at one end thereof and fixed to the other end of the latch plate at the other end thereof, wherein the second spring is elastically extended at a locking location of the latch plate.

Various aspects of the present invention provide for an active hood apparatus including a first slot and a second slot formed in a front surface and both side surfaces of the main frame and a first guide pin and a second guide pin integrally formed in a front surface and both side surfaces of a body plate of the hood latch assembly and movably inserted into the first slot and the second slot, respectively.

Various aspects of the present invention provide for an active hood apparatus including a locking hook integrally protruding at an inner side of the upper end of the locking lever and a locking step integrally protruding at an outer side of an upper end of the latch plate to be engaged with the locking hook.

Various aspects of the present invention provide for a hood rise and fall device may include: a hood rise and fall lever having (i) a locking groove at one end thereof, into which a first guide pin formed in a body plate of the hood latch assembly is lockably inserted, and (ii) a push-up end protruding under the locking groove for pushing up the first guide pin, wherein the hood rise and fall lever is hinge-coupled to the main frame at the other end thereof; a third spring disposed at a hinge coupling point of the hood rise and fall lever for providing an elasticity force when the hood rise and fall lever pivots upwardly; a stop lever hinge-coupled to the main frame at one end thereof and having a hook groove engaged with an end of the hood rise and fall lever at the other end thereof; an actuator for pushing up the hook groove of the stop lever at a certain location of the main frame and releasing the hood rise and fall lever; and a fourth spring wound around a hinge point of the stop lever and elastically compressed upon pivoting of the stop lever for releasing the hood rise and fall lever.

Various aspects of the present invention provide for an active hood apparatus that may further include a vertical end disposed under the hook groove of the stop lever and adhering closely to a piston of the actuator to be pushed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
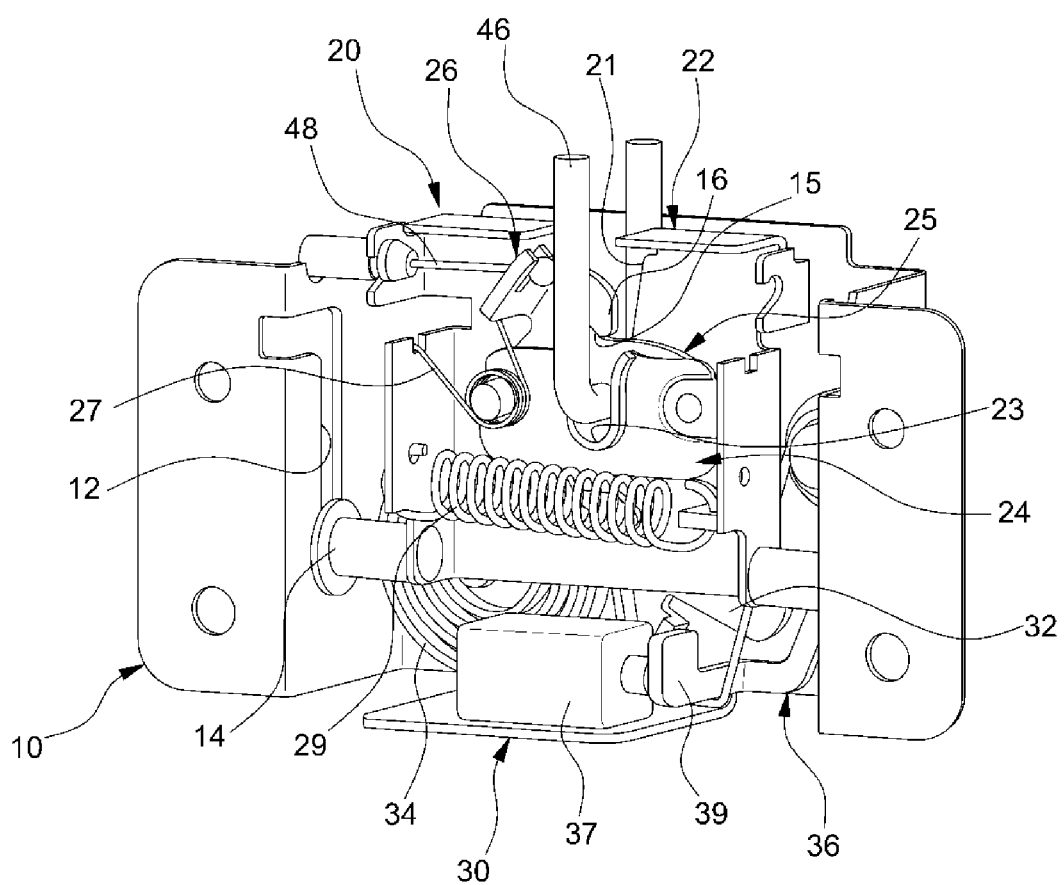
FIGS. 1 and 2 are perspective views illustrating an exemplary active hood apparatus for a vehicle according to the present disclosure.
Figure 2:
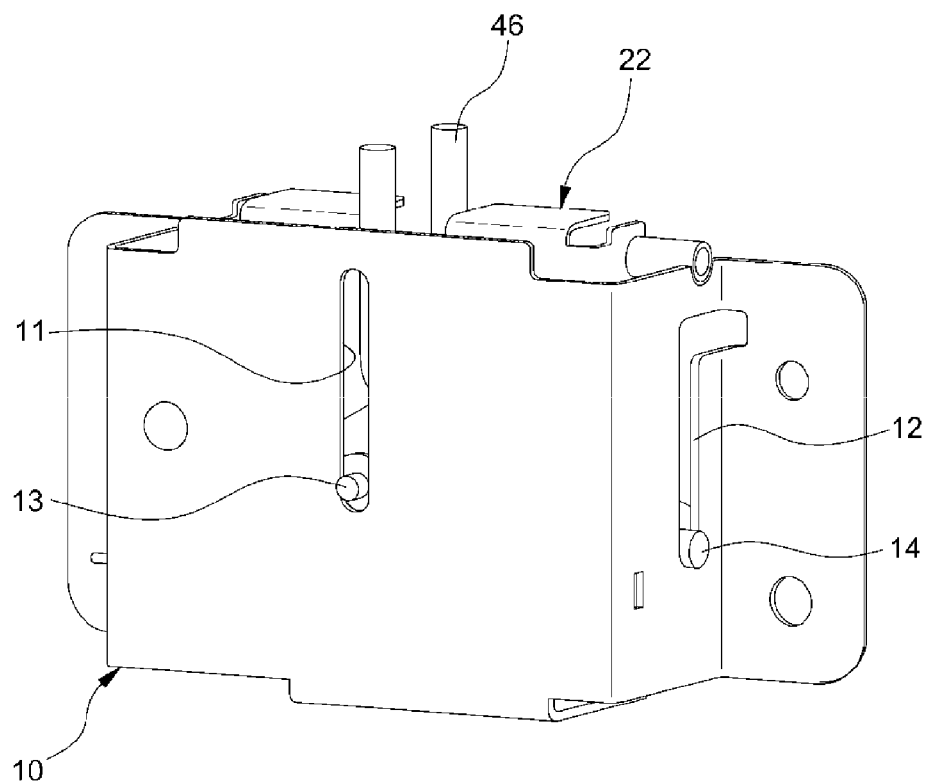
Figure 3:
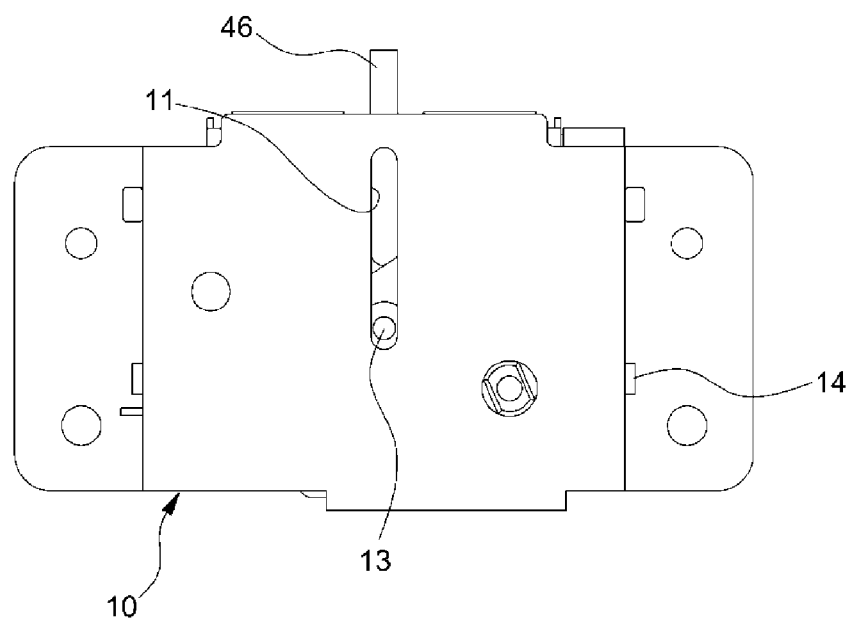
FIGS. 3 and 4 are front and rear views illustrating an exemplary active hood apparatus for a vehicle according to the present disclosure.
Figure 4:
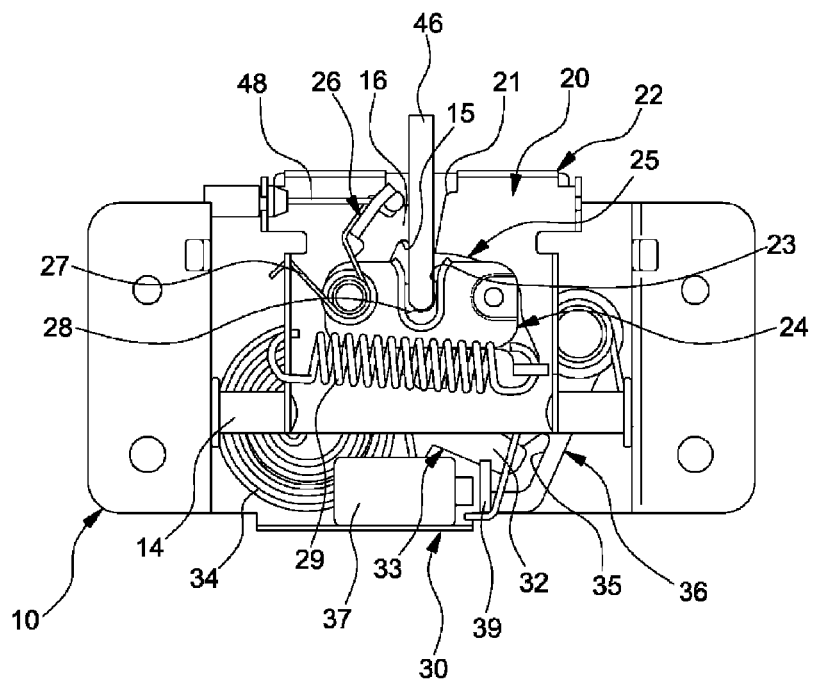

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or any other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

According to various embodiments, the pedestrian impact-absorbing and damage-reducing effects can be significantly improved upon collision with a pedestrian, by enabling the rise and fall of the front end of a hood as well as the rise and fall of the rear end thereof by a typical hinge actuator. It would be appreciated that improved performance is not limited to the collision with a pedestrian. Embodiments of the present invention can be used for reducing damages in collision having similar impacts with other vehicles, elements or structures.

For this, as shown in FIGS. 1 through 7, a hood latch assembly 20 may be vertically movably disposed on a main frame 10 fixed to a vehicle body such that the hood latch assembly 20 mounted in the vehicle body is ascended and descended by a hood rise and fall device 30, and the hood rise and fall device 30 may be fixedly disposed on the main frame 10.

The main frame 10 may have a concavely bent shape at the central portion of the rear surface thereof. A first slot 11 and a second slot 12 may be substantially vertically formed in the front surface and the both side surfaces of the main frame 10. The both ends of the main frame may be fixedly coupled to a vehicle body, for instance, at the front side of the engine room.

The hood latch assembly 20 for locking and releasing the hood may be disposed at the back side of the main frame 10, and may be coupled to the main frame 10 to be substantially vertically movable by the actuation of the hood rise and fall device 30 upon collision with a pedestrian.

Hereinafter, the configuration of a hood latch assembly according to various embodiments of the present disclosure will be described in detail with reference to FIGS. 1 through 4.

A body plate 22 may be provided in the hood latch assembly 20 to serve as a frame. The body plate 22, which is a rectangular plate or a plate of other suitable shapes, may have a first insert aperture 21 at the upper portion thereof, into which a striker 46 formed integrally and/or monolithically with the hood 44 is detachably inserted, and may have a first guide pin 13 and a second guide pin 14 integrally and/or monolithically formed in the front surface and the both side surfaces of the body plate 22.

The first guide pin 13 of the body plate may be vertically movably inserted into the first slot 11 formed in the front surface of the main frame 10, and the second guide pin 14 may be vertically movably inserted into the second slot 12 formed in the both side surfaces of the main frame 10.

In this case, an auxiliary plate 24 having a smaller area may be disposed to be spaced from the rear surface of the body plate 22, and a second insert aperture 23 may be formed at the upper portion of the auxiliary plate 24 to match the first insert aperture 21.

Also, a hood release cable 48 may be mounted at one side of the upper portion of the body plate 22. The hood release cable 48 may be pulled by the operation of a lever equipped in a driver's seat.

A locking lever 26 may be pivotably disposed at one side between the body plate 22 and the auxiliary plate 24. The upper end of the locking lever 26 may be connected to the hood release cable 25 and the lower end of the locking lever 26 may be hinge-coupled to one side of the auxiliary plate 24.

A first spring 27 of a return spring type may be disposed to provide an elasticity force to the locking lever 26. One end of the first spring 27 may be fixed to one side of the body plate 22, and the other end of the first spring 27 may be fixed to the upper end of the locking lever 26. The first spring 27 may be elastically compressed when the locking lever 26 is pulled together with the hood release cable 25.

Also, a latch plate 25 may be pivotably disposed at the other side between the body plate 22 and the auxiliary plate 24. A third insert aperture 28 may be formed at one end of the latch plate 25. The striker 46 inserted through the first insert aperture 21 and the second insert aperture 23 may be lockably inserted into the third insert aperture 28. The other end of the latch plate 25 may be hinge-coupled to the other side of the auxiliary plate 24.

A second spring 29 of an extension spring type may be disposed to provide an elasticity force to the latch plate 25. One end of the second spring 29 may be fixed to one side of the body plate 22, and the other end of the second spring 29 may be fixed to the other end of the latch plate 25. The second spring 29 may be extended at a locking location of the latch plate 25, and may provide an elastic force when the latch plate 25 pivots into a releasing location of the latch plate 25.

A locking hook 16 may integrally and/or monolithically protrude at an inner side of the upper portion of the locking lever 26, and a locking step 15 on which the locking hook 16 is latched may integrally and/or monolithically provide at an outer side of the upper portion of the latch plate 25. Accordingly, when the latch plate 25 places the striker 46 on the locking location, the locking hook 16 of the locking lever 26 may be latched on the locking step 15 of the latch plate 25 to lock the latch plate 25.

Figure 6:
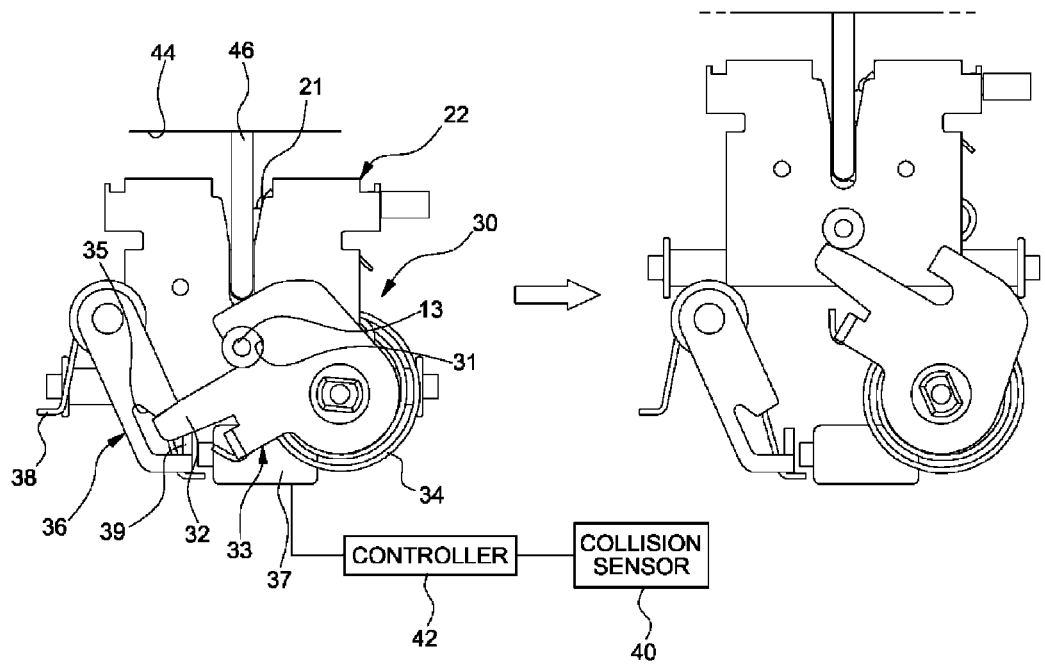
FIGS. 6 and 7 are front and rear views illustrating operations of an exemplary active hood apparatus for a vehicle upon collision with a pedestrian according to the present disclosure.
Figure 7:
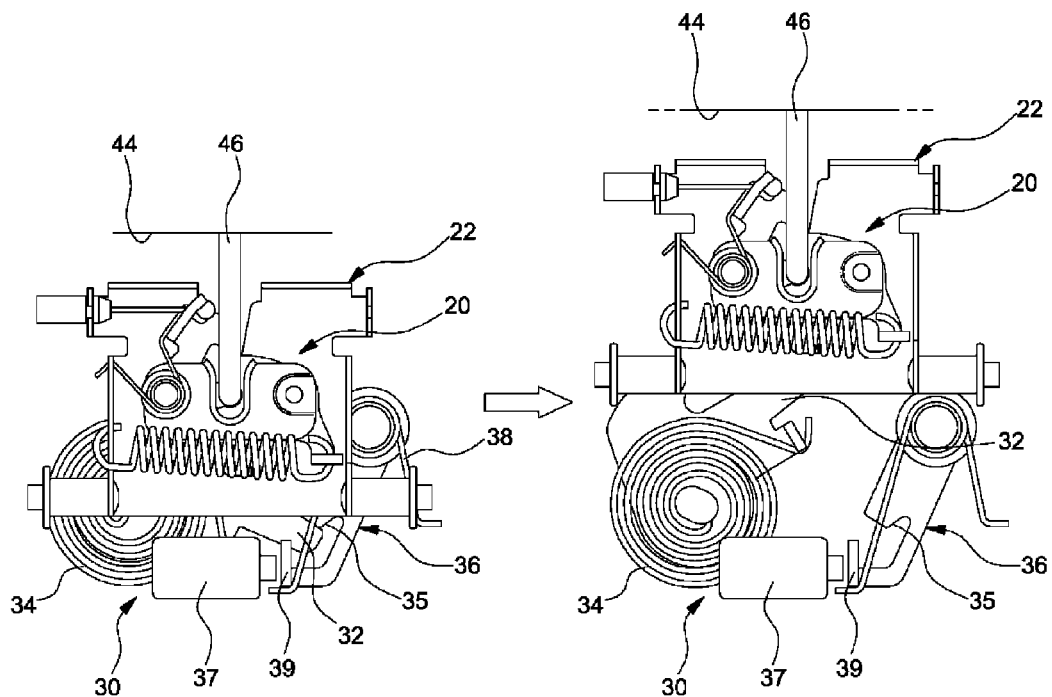
Figure 8:
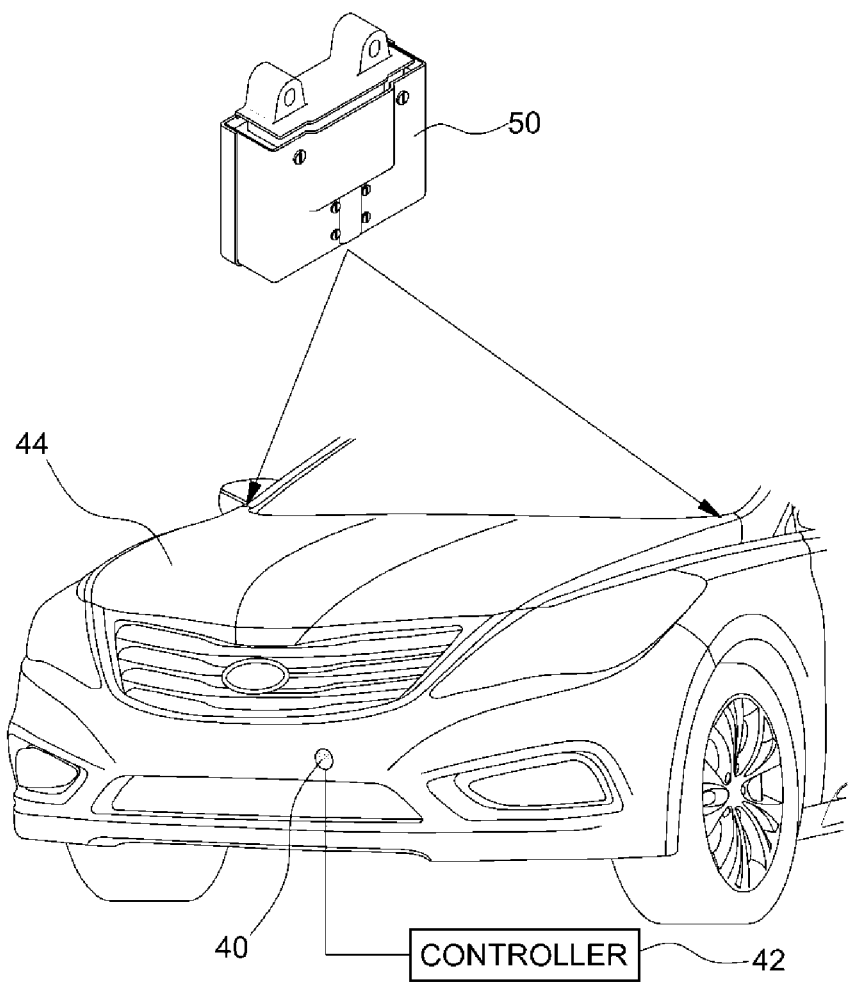
FIG. 8 is a schematic view illustrating a typical active hood apparatus.

Hereinafter, the configuration of a hood rise and fall device according to various embodiments of the present disclosure will be described in detail with reference to FIGS. 6 and 7.

First, a hood rise and fall lever 33 may be pivotably mounted in the main frame 10. A locking groove 31 into which the first guide pin 13 disposed in the body pin 22 of the hood latch assembly 20 is lockably inserted may be formed in one end of the hood rise and fall lever 33. A push-up end 32 may protrude just under the locking groove 31 to push up the first guide pin 13. The other end of the hood rise and fall lever 33 may be hinge-coupled to the main frame 10.

In this case, a third spring 34 of a coil spring type may be mounted on the hinge coupling point of the hood rise and fall lever 33 to provide an elastic force when the hood rise and fall lever 33 pivots upwardly.

Also, a stop lever 36 may be mounted in the main frame 10 to constrain the hood rise and fall lever 33 at normal times and release the hood rise and fall lever 33 upon collision with a pedestrian. The upper end of the stop lever 36 may be hinge-coupled to the main frame 10. Also, a hook groove 35 may be formed at the other end of the stop lever 36, and may be engaged with the end of the hood rise and fall lever 33.

Particularly, for the release of the hood rise and fall lever 33, an actuator 37 may be mounted at a certain location of the main frame 10 to push the hook groove 35 of the stop lever 36. A vertical end 39 may be integrally and/or monolithically formed just under the hook groove 35 of the stop lever 36, and may closely adhere to a piston of the actuator 37 to be easily pushed.

Also, a fourth spring 38 may be mounted on a hinge point of the stop lever 36, and may be elastically compressed upon pivoting of the stop lever 36 for releasing.

Hereinafter, the operation of an active hood apparatus for a vehicle according to various embodiments of the present disclosure will be described with reference to the accompanying drawings.

Releasing of Hood Latch Assembly at Normal Times

Figure 5:
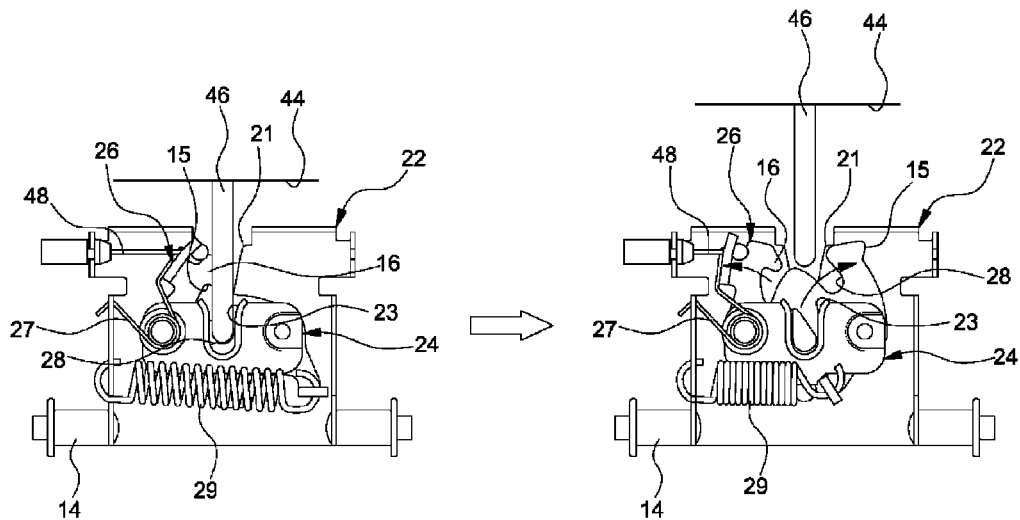
FIG. 5 is a rear view illustrating exemplary locking and releasing operations of a hood at normal times in an exemplary active hood apparatus for a vehicle according to the present disclosure.

As shown in FIG. 5, the hood latch assembly may perform locking and releasing of the hood at normal times.

When a lever equipped in the driver's seat is operated to open the hood, the hood release cable 48 may be pulled and thus the upper end of the locking lever 26 may be pulled. Accordingly, the locking lever 26 may elastically compress the first spring 27 at the upper end thereof and may pivot on the hinge coupling point at the lower end thereof.

In this case, as the upper end of the locking lever 26 pivots, the locking hook 16 formed at the inner side of the upper end thereof may be unlatched from the locking step 15 of the latch plate 25.

Simultaneously, the latch plate 25 may allow the striker 46 to pivot from the locking location to the releasing location by the elastic force of the second spring 29. Since the latch plate 25 pushes up the striker 46 inserted into the third insert aperture 28 while pivoting, the hood 44 mounted with the striker 46 may be opened.

Rise and Fall of Hood Latch Assembly and Hood

When the pedestrian collision sensor 40 senses a collision with a pedestrian, as described above, the controller 42 may receive a collision signal to operate the hinge actuator 50. The operation of the hinge actuator 50 may allow the hinge assembly to rise and the rear end of the hood 44 mounted with the hinge assembly to rise.

According to various embodiments of the present disclosure, the rising operation of the front end of the hood 44 as well as the rear end of the hood 44 may be performed as follows.

When the piston of the actuator 37 is forwardly driven according to a command signal of the controller 42, the piston may push the vertical end 39 of the stop lever 36 to allow the lower end of the stop lever 36 to pivot.

Simultaneously, the hood rise and fall lever 33 constrained in the hook groove 35 of the stop lever 36 may be released, and thus the hood rise and fall lever 33 may be upwardly pivoted by an elastic force of the third spring 34.

Next, the first guide pin 13 disposed in the body plate 22 of the hood latch assembly 20 inserted into the locking groove 31 of the hood rise and fall lever 33 may be withdrawn, and simultaneously the push-up end 32 of the hood rise and fall lever 33 may push up the first guide pin 13.

Accordingly, the first guide pin 13 disposed in the front surface of the body plate 22 of the hood latch assembly 20 may move substantially vertically along the first slot 11 of the main frame 10, and the second guide pin 14 of the body plate 22 may move substantially vertically along the second slot 12 of the main frame 10, allowing the hood latch assembly to move substantially vertically.

Thus, the striker 46 lockably and releasably fitted to the hood latch assembly 20 may be pushed up along with the rise and fall of the hood latch assembly 20, and therefore the front end of the hood 44 integrated with the striker 46 may move substantially vertically, serving to absorb an impact with a pedestrian.

The present disclosure provides the following advantages.

According to embodiments, the pedestrian impact-absorbing effect can be improved, and the pedestrian damage can be significantly reduced upon collision with a pedestrian, by enabling the rise and fall of the front end of a hood as well as the rise and fall of the rear end thereof by a typical hinge actuator.

Specifically, the opening/closing of the hood may be performed by a hood latch assembly at normal times, while the hood latch assembly may be ascended and descended by a hood rise and fall device and simultaneously a hood striker coupled to the hood latch assembly is also ascended and descended upon collision with a pedestrian. As a result, since the front end of the hood can rise and fall together with the rear end of the hood to push up a pedestrian, the impact-absorbing effect can be improved, and the damage of the pedestrian can be significantly reduced upon collision with the pedestrian.

For convenience in explanation and accurate definition in the appended claims, the terms "upper" or "lower", "front" or "rear", "inside" or "outside", and etc. are used to describe features of the exemplary embodiments with reference to the positions of such features as displayed in the figures.

The foregoing descriptions of specific exemplary embodiments of the present disclosure have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present disclosure, as well as various alternatives and modifications thereof. It is intended that the scope of the invention be defined by the Claims appended hereto and their equivalents.

What is claimed is:

1. An active hood apparatus comprising:
    a main frame fixed to a vehicle body;
    a hood latch assembly disposed at a back side of the main frame for locking and releasing a hood; and
    a hood rise and fall device disposed between the back side of the main frame and the hood latch assembly, the hood rise and fall device moving the hood latch assembly substantially vertically by a control signal of a controller that receives a sensing signal from a pedestrian collision sensor;
    wherein the hood latch assembly comprises:
        a body plate having a first insert aperture into which a striker integrated with the hood is detachably inserted;
        an auxiliary plate having a second insert aperture that matches the first insert aperture, the auxiliary plate disposed to be spaced from a rear surface of the body plate;
        a hood release cable disposed at one side of an upper end of the body plate;
        a locking lever connected to the hood release cable at an upper end thereof and hinge-connected to one side of the auxiliary plate at a lower end thereof;
        a first spring fixed to one end of the body plate at one end thereof and fixed to the upper end of the locking lever at the other end thereof, wherein the first spring is elastically compressed when the locking lever is pulled;
        a latch plate having a third insert aperture at one end thereof, into which the striker inserted through the first insert aperture and the second insert aperture is lockably inserted, and the latch plate hinge-coupled to the other end of the auxiliary plate at the other end thereof; and
        a second spring fixed to one end of the body plate at one end thereof and fixed to the other end of the latch plate at the other end thereof, wherein the second spring is elastically extended at a locking location of the latch plate.

2. The active hood apparatus of claim 1, further comprising:
    a first slot and a second slot formed in a front surface and both side surfaces of the main frame; and
    a first guide pin and a second guide pin integrally formed in a front surface and both side surfaces of a body plate of the hood latch assembly and movably inserted into the first slot and the second slot, respectively.

3. The active hood apparatus of claim 1, further comprising:
    a locking hook integrally protruding at an inner side of the upper end of the locking lever; and
    a locking step integrally protruding at an outer side of an upper end of the latch plate to be engaged with the locking hook.

4. The active hood apparatus of claim 1, wherein the hood rise and fall device comprises:
    a hood rise and fall lever having (i) a locking groove at one end thereof, into which a first guide pin formed in a body plate of the hood latch assembly is lockably inserted, and (ii) a push-up end protruding under the locking groove for pushing up the first guide pin, wherein the hood rise and fall lever is hinge-coupled to the main frame at the other end thereof;
    a third spring disposed at a hinge coupling point of the hood rise and fall lever for providing an elasticity force when the hood rise and fall lever pivots upwardly;
    a stop lever hinge-coupled to the main frame at one end thereof and having a hook groove engaged with an end of the hood rise and fall lever at the other end thereof;
    an actuator for pushing up the hook groove of the stop lever at a certain location of the main frame and releasing the hood rise and fall lever; and
    a fourth spring wound around a hinge point of the stop lever and elastically compressed upon pivoting of the stop lever for releasing the hood rise and fall lever.

5. The active hood apparatus of claim 4, further comprising a vertical end disposed under the hook groove of the stop lever and adhering closely to a piston of the actuator to be pushed.

\* \* \* \* \*